(12) United States Patent
Garzon et al.

(10) Patent No.: US 11,124,667 B2
(45) Date of Patent: Sep. 21, 2021

(54) INKJET INK COMPOSITIONS

(71) Applicant: Afik Zach, Jerusalem (IL)

(72) Inventors: Aaron Garzon, Rehovot (IL); Moshe Zach, Nes Ziona (IL)

(73) Assignee: Afik Zach, Jerusalem (IL)

( * ) Notice: Subject to any disclaimer, the term of this patent is extended or adjusted under 35 U.S.C. 154(b) by 0 days.

(21) Appl. No.: 15/775,111

(22) PCT Filed: Nov. 13, 2016

(86) PCT No.: PCT/IL2016/051224
§ 371 (c)(1),
(2) Date: May 10, 2018

(87) PCT Pub. No.: WO2017/081694
PCT Pub. Date: May 18, 2017

(65) Prior Publication Data
US 2018/0371280 A1 Dec. 27, 2018

(51) Int. Cl.
*C09D 11/54* (2014.01)
*C09D 11/322* (2014.01)
*D06P 1/613* (2006.01)
*D06P 1/52* (2006.01)
*D06P 1/44* (2006.01)
*D06P 5/00* (2006.01)
*D06M 13/432* (2006.01)
*D06P 1/651* (2006.01)
*D06P 1/653* (2006.01)
*C09D 11/40* (2014.01)
*B41M 5/00* (2006.01)
*C09D 11/037* (2014.01)
*C09D 11/107* (2014.01)
*C09D 11/38* (2014.01)
*D06P 5/30* (2006.01)
*B41J 2/21* (2006.01)

(52) U.S. Cl.
CPC .............. *C09D 11/54* (2013.01); *B41J 2/2107* (2013.01); *B41M 5/0017* (2013.01); *B41M 5/0023* (2013.01); *C09D 11/037* (2013.01); *C09D 11/107* (2013.01); *C09D 11/322* (2013.01); *C09D 11/38* (2013.01); *C09D 11/40* (2013.01); *D06M 13/432* (2013.01); *D06P 1/44* (2013.01); *D06P 1/5257* (2013.01); *D06P 1/6133* (2013.01); *D06P 1/653* (2013.01); *D06P 1/65118* (2013.01); *D06P 5/001* (2013.01); *D06P 5/002* (2013.01); *D06P 5/30* (2013.01)

(58) Field of Classification Search
CPC ........ B41J 2/1433; B41J 2/161; B41J 2/1623; B41J 2202/00; B41J 2202/03; B41J 2/14201; B41J 2/045; B41J 2/04588; B41J 2/04595; B41J 2/04586; B41J 2/14274; B41J 11/0015; B41J 11/002; B41J 2/01; B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 3/4078; B41J 29/377; B41M 5/0011; B41M 5/0017; B41M 5/0047; B41M 7/00; B41M 7/0072; B41M 5/52; B41M 5/5218; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B65H 23/26; B65H 2404/14211; D06P 5/001; D06B 19/0076

See application file for complete search history.

(56) References Cited

U.S. PATENT DOCUMENTS

| 8,623,126 | B1 * | 1/2014 | Brust ..................... C09D 11/38 106/31.65 |
| 2005/0018215 | A1 | 1/2005 | Ruhe et al. |
| 2005/0182154 | A1 | 8/2005 | Berge et al. |
| 2005/0282930 | A1 | 12/2005 | Fu et al. |
| 2007/0056118 | A1 | 3/2007 | Ellis |
| 2007/0060670 | A1 | 3/2007 | Ellis |
| 2010/0227067 | A1 | 9/2010 | Namba et al. |
| 2013/0071535 | A1 * | 3/2013 | Fenyvesi .................. A61Q 5/02 426/534 |
| 2013/0253106 | A1 | 9/2013 | Saito et al. |
| 2015/0361285 | A1 * | 12/2015 | Breton ................... C09D 11/38 347/20 |

FOREIGN PATENT DOCUMENTS

| CN | 103468059 A | 12/2013 |
| EP | 2865531 A1 | 4/2015 |
| WO | 2009034394 A1 | 3/2009 |

(Continued)

OTHER PUBLICATIONS

International Search Report PCT/IL2016/051224 Completed: Feb. 23, 2017; dated Feb. 27, 2017 5 pages.

(Continued)

*Primary Examiner* — Manish S Shah
(74) *Attorney, Agent, or Firm* — The Roy Gross Law Firm, LLC; Roy Gross

(57) ABSTRACT

Novel inkjet ink formulations having a humectant composition, at least one pigment, and at least one compound selected from a binder, a defoamer, a leveling agent, an antibacterial agent, and a neutralizing agent; and water is disclosed. A method for printing on a flexible substrate is further disclosed.

12 Claims, No Drawings

(56) References Cited

FOREIGN PATENT DOCUMENTS

WO     WO-2009034394 A1 *   3/2009   ............. C09D 11/36
WO        2015130498 A2     9/2015

OTHER PUBLICATIONS

Written Opinion of the International Searching Authority PCT/IL2016/051224 dated Feb. 27, 2017 8 pages.
PCT Search Report for International Application No. PCT/IL2016/051224; dated Feb. 27, 2017; 5 pp.
PCT Written Opinion for International Application No. PCT/IL2016/051224; dated Feb. 27, 2017; 8 pp.
PCT Preliminary Report for International Application No. PCT/IL2016/051224; dated May 15, 2018; 9 pp.

* cited by examiner

INKJET INK COMPOSITIONS

RELATED APPLICATIONS

This application is a National Phase of PCT Patent Application No. PCT/IL2016/051224 having International filing date of Nov. 13, 2016, which claims the benefit of priority of U.S. patent application Ser. No. 62/254,242 filed on Nov. 12, 2015. The contents of the above applications are all incorporated by reference as if fully set forth herein.

FIELD OF THE INVENTION

The present invention, in some embodiments thereof, relates to inkjet ink printing methods and compositions.

BACKGROUND OF THE INVENTION

The ever growing market of printing complex designs and images on almost every type of surface, and especially on knitted, woven and non-woven textile surfaces, plasticized and laminated fabrics (soft signage) and the likes, creates demands for new and more versatile printing technologies and materials. One such demand is for ink compositions and technologies which will be suitable for printing long lasting, durable, abrasion resistant, water-, detergent- and chemical-fast color images on a variety of materials, which will not wear out rapidly upon use, handling, washing and exposure to the environment. The garment industry is possibly the most demanding in terms of printing high quality and durable prints on textile, adding some requirements from the product, such as pleasant hand-feel of the printed area, flexible (bendable without cracking), stretchable and aerated print area, as well as following the guidelines of internationally accepted standards such as the Oeko-Tex Standard 100 (an international testing and certification system for textiles, limiting the use of certain chemicals, which was developed in 1992) and GOTS (Global Organic Textile Standard).

One of the most promising technologies for printing high quality color images on a wide variety of substrates, such as textile surfaces, is inkjet printing. Inkjet printing is a widespread technique in which a stream of a specific liquid ink composition is ejected as droplets from a cluster of minute nozzles (printheads) in response to electrical signals generated by a microprocessor to record characters and patterns on the surface of a printing subject without making direct contact between the ink application apparatus and the surface of the subject (non-impact printing).

The presently available ink compositions, including compositions that are suitable for inkjet printing, include aqueous-based ink compositions and non-aqueous solvent-based ink compositions. The more commonly used inkjet compositions are aqueous-based ink compositions, which typically include water and a colorant, usually a dye or pigment dispersion, and may further contain a number of additives for imparting certain attributes to the ink as it is being applied (jetted), e.g., improved stability and flow, anti-corrosiveness, and feather and bleeding resistance, as well as attributes to affect its final cured properties such as the capability to form chemical bonds with the substrate, improved adhesion to the substrate, flexibility, stretchability, softness and the like.

One of the challenges in printing on fabric is its absorbability, which is far more challenging than that of, for example, paper or non-adsorbent substrates. It is also known in the art the difficulty encountered in attempting to print on cotton and other natural fiber fabrics by sublimation transfer of sublimable dyes. Known methods have included pretreatment or coating of either the fabric or a conventional sublimation transfer paper with various chemicals to enable fabrics containing cotton or other natural fibers to accept sublimable dyestuffs.

To ensure high quality images by inkjet, the ink composition should be characterized by free passage through the nozzles, minimal bleeding, paddling and/or smearing, uniform printing on the surface of the subject, wash-fastness, simple system cleaning and other chemical and physical characteristics. To meet these requirements, the ink composition should be characterized, for example, by suitable viscosity, solubility, volatility, surface tension, compatibility with other components of the printing system and, in cases of continuous flow inkjet printing, electrical resistance, and further be applied using suitable apparatus, techniques and processes.

In case of printed fabrics (e.g., printed garments), in order to sustain wear and tear due to frequent use and wash cycles, the printed image on the final product, as well as the final product itself, should exhibit the properties of an elastic yet aerated film, and therefore the ink composition should also contain components which can impart such compressibility (softness), plasticity, elasticity, flexibility and stretchability.

Conventional inkjet inks may contain two types of colored material, dye or pigment, and are characterized by their main liquid, which is the vehicle for the ink. As used herein, the terms "dye" or "pigment" is a general wording for materials, which are soluble or insoluble, respectively, in the solvents comprising the ink.

Since inkjet compositions contain, in addition to dyes or pigments, other additives, such as binders (polymeric additives, which improve the dye or pigment binding to substrate), the binders should be compatible with the other substances in the inkjet compositions and should not change noticeably the physicochemical and rheological characteristics of inks.

U.S. patent application Ser. No. 13/849,189 discloses an ink composition for ink jet textile printing, the ink composition containing a pigment, a urethane resin emulsion, an emulsion-type silicone compound, and water, wherein the urethane resin emulsion content is 3.5 to 14 mass % relative to the total mass of the ink composition, the emulsion-type silicone compound content is in the range of 0.4 to 3.0 mass % relative to the total mass of the ink composition, and the water content is in the range of 20 to 80 mass % relative to the total mass of the ink composition.

SUMMARY OF THE INVENTION

The present invention, in some embodiments thereof, relates to inkjet printing compositions and methods using.

According to an aspect of some embodiments of the present invention there is provided a formulation comprising a humectant composition and a pigment, and further comprising a compound selected from:
 (a) a binder;
 (b) a defoamer;
 (c) a leveling agent;
 (d) an antibacterial agent;
 (e) a neutralizing agent, and
 (f) water
 wherein:
 the humectant composition is at a concentration that ranges from 10% to 40%, by weight; and the humectant composition comprises at least two organic compounds comprising one or more hydroxyl groups, wherein the at least two organic compounds are in a weight ratio that rages from about 0.5 to 1.5 with each other.

In some embodiments, the pigment is in the form of a dispersion. In some embodiments, the pigment is a microsized or nanosized particle.

In some embodiments, the at least two organic compounds comprise glycerol and one or more compounds selected from glycols (diols). In some embodiments, the glycols are selected from the group consisting of: propylene glycol, polyethylene glycol (PEG), and mono-, di- and tri-propylene glycol. In some embodiments, the glycol is PEG, wherein the PEG has a molecular weight that ranges from 200 Dalton to 600 Dalton. In some embodiments, the binder comprises an acrylic polymer having a glass transition temperature ($T_g$) below 50° C.

In some embodiments, the humectant composition is at a concentration of below 25%, by weight. In some embodiments, the humectant composition is at a concentration of above 25%, by weight.

In some embodiments, the binder is at a concentration that ranges from 3% to 15%, by weight.

In some embodiments, the disclosed formulation comprises between about 15% to 30%, by weight, of the humectant composition and:
a) between about 3-20%, by weight, of the binder;
b) between about 1-20%, by weight, of the pigment;
c) between about 0-2% of the leveling agent;
d) between about 0-1% of the neutralizing agent, and
e) between 50-70% of water.

In some embodiments, the formulation has a viscosity of 4 to 6 cP at 25° C. In some embodiments, the formulation has a viscosity of 6 to 8 cP at 25° C. In some embodiments, the formulation has a viscosity of 8 to 15 cP at 25° C.

According to an aspect of some embodiments of the present invention there is provided a composition comprising: (i) one or more organic acids and (ii) one or more acrylic polymers,
wherein:
a) the organic acids are selected from: lactic acid, formic acid, citric acid glycolic acid, succinic acid, tartaric acid, fumaric acid, and malic acid or a mixture or polymer thereof;
b) the one or more acrylic polymers are self-crosslinking polymers;
c) the one or more organic acids and the one or more acrylic polymers, are each at a concentration that ranges from 0.5% to 10%, by weight.

In some embodiments, the disclosed composition is a water-based formulation.

In some embodiments, the one or more organic acids are at a total concentration of between 0.3% to 0.7%, by weight, and the one or more acrylic polymers are at a total concentration of 1.5% to 5%, by weight.

In some embodiments, the disclosed composition is identified for use prior to inkjet printing onto a flexible substrate. In some embodiments, the use is for immersing the flexible substrate in the composition.

According to an aspect of some embodiments of the present invention there is provided a method for printing on a flexible substrate, the method comprising:
incorporating into a printing head the disclosed formulation comprising a humectant composition and a pigment;
immersing the flexible substrate in the disclosed composition comprising: one or more organic acids and one or more acrylic polymers;
drying the flexible substrate; and
printing the formulation onto the substrate;

In some embodiments, the method comprises incorporating into a printing head the disclosed formulation comprising a humectant composition and a pigment.

In some embodiments, the printing is performed using a printing head.

In some embodiments, the flexible substrate is an absorptive substrate. In some embodiments, the flexible substrate is selected from woven and non-woven fabrics, cotton, polyester, natural and synthetic leather.

DETAILED DESCRIPTION

The present invention, in some embodiments thereof, relates to inkjet printing compositions and, more particularly, but not exclusively, to improved processes and compositions for inkjet printing on flexible substrates.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

As discussed in detail hereinabove, there is an ever-growing need for methods and compositions for improved performance of direct inkjet printing technologies, particularly on challenging substrates such as highly absorptive materials, including, but not limited to, knitted, woven or unwoven, textile and garments that are designed and expected to stretch and laundered regularly, as well as on non-woven fabrics, soft signage and the like.

The present inventors have recognized that factors which govern the localization and confinement of the liquid ink droplets on top of impregnable substrates should be considered and mitigated as well as the requirement for flexible and sustainable print-work.

The inventors of the invention disclosed in the present application have successfully developed a composition, being, in some embodiments, in the form of an ink formulation (herein referred to interchangeably as "the ink formulation", "the inkjet ink formulation", "the disclosed formulation", or "the formulation of the invention") which are intended specifically for printing color images on stretchable and flexible absorptive substrates.

Non-limiting examples of stretchable and flexible absorptive substrates are selected from woven and non-woven fabrics, cotton, polyester and their respective mixtures, natural and synthetic leather, as well as on stretchable and flexible non-absorptive (impervious) substrates.

In some embodiments, the disclosed formulations, when utilized in direct inkjet printing processes, produce, or allow to produce, durable color images that exhibit resistance to water and other chemicals, as well as to stretching and flexing, and yet are of high-quality in terms of resolution and color-depth and have a pleasant/soft hand-feel. These formulations may further employ the optional use of substances that can flatten the protruding fibers of fabrics so as to afford sharper images.

Humectants

In some embodiments, there is provided a formulation comprising a humectant composition.

Humectants are typically used for adjusting surface tension and viscosity—as well as for avoiding nozzle blockage due to formation of a dried film. These include, without limitation, polyethylene glycol and other polyalcohol mixtures.

In some embodiments, the disclosed formulation is an aqueous composition comprising between about 10-40%, by weight, of a humectant composition. In some embodiments, the disclosed formulation is an aqueous composition comprising between about 10%-15%, by weight, of a humectant composition. In some embodiments, the disclosed formulation is an aqueous composition comprising between about 15-20%, by weight, of a humectant composition. In some embodiments, the disclosed formulation is an aqueous composition comprising between about 20-25%, by weight, of a humectant composition. In some embodiments, the disclosed formulation is an aqueous composition comprising between about 25-30%, by weight, of a humectant composition. In some embodiments, the disclosed formulation is an aqueous composition comprising between about 30-35%, by weight, of a humectant composition. In some embodiments, the disclosed formulation is an aqueous composition comprising between about 35-40%, by weight, of a humectant composition.

As used herein, the term "aqueous composition" (or aqueous formulation) refers to water or a mixture of water and other components in which the components are substantially dissolved or dispersed by the water and substantially do not phase separate or precipitate.

In some embodiments, the disclosed formulation comprises 0 to 50% water, by total weight.

In some embodiments, the disclosed formulation comprises 50% to 90% water, by total weight. In some embodiments, the disclosed formulation comprises e.g., 50%, 55%, 60%, 65%, 70%, 75%, 80%, 85%, or 90% water, by total weight, including any value therebetween. In some embodiments, the composition comprises e.g., 50% to 60%, 60% to 65%, 65% to 70%, 70% to 75%, 75% to 80%, 80% to 85%, or 85% to 70%, of water, by total weight.

In some embodiments, the humectant composition is at a concentration that ranges from 10% to 40%, by weight.

In some embodiments, the humectant composition comprises at least two organic compounds each comprising one or more hydroxyl groups. In some embodiments, the at least two organic compounds are in a weight of 10:1, 5:1, 4:1, 3:1, 2:1, 1:1, 1:2, 1:3, 1:4, 1:5, or 1:10, ratio to each other, including any value therebetween.

In some embodiments, the at least two organic compounds are chemically different from each other. As used herein the term "chemically different" means different chemical entities. In some embodiments "chemically different" refers to partially different, e.g., in one or more atoms or bonding type in the compounds. In some embodiments, "chemically different" refers to different structure e.g., different isomers.

In some embodiments, the hydroxyl groups are covalently attached to an aliphatic, aromatic, heterocyclic, alicyclic, or a silicone chain or ring.

In some embodiments, the organic compound in the humectant composition comprises a triol, e.g., propane-1,2,3-triol, and one or more glycols. In some embodiments, the humectant composition comprises one glycol compound. In some embodiments, the humectant composition comprises two glycol compounds. In some embodiments, the humectant composition comprises three glycol compounds.

In some embodiments, the glycol is selected from: mono-, di- and tri-ethylene glycol. In some embodiments, the glycol is selected from: mono-, di- and tri-propylene glycol.

In some embodiments, the glycol compound is selected from, without being limited thereto, 1,2-hexanediol, propane-1,2-diol (PG), and polyethylene glycol (PEG). In some embodiments, the PEG has an average molecular weight than ranges from about 50 Dalton to about 600 Dalton.

In exemplary embodiments, the PEG has an average molecular weight of about 400 Dalton.

In some embodiments, PEG has brunch chains e.g., has three to ten PEG chains emanating from a central core group.

In some embodiments, the humectant composition comprises 4, 5, 6, 7, 8, 9, or 10 glycol compounds.

In some embodiments, the humectant composition is characterized in that the glycol compounds (e.g., the two glycol compounds of 1,2-hexanediol, PG, and PEG) have a weight ratio that ranges from 0.5 to 1.5 with each other. In some embodiments, the glycol compounds have a weight ratio that ranges from 0.7 to 1.3 with each other. In some embodiments, the glycol compounds have a weight ratio that ranges from 0.8 to 1.2, with each other. In some embodiments, the glycol compounds have a weight ratio that ranges from 0.9 to 1.1, with each other.

In some embodiments, the humectant composition is characterized in that the triol and the glycol compound(s) (e.g., 1,2-hexanediol, PG, and/or PEG) have a weight ratio that ranges from 0.5 to 1.5, with each other. In some embodiments, the triol and the glycol compound(s) have a weight ratio that ranges from 0.7 to 1.3, with each other. In some embodiments, the triol and the glycol compound(s) have a weight ratio that ranges from 0.8 to 1.2, with each other.

In some embodiments, the glycol compounds have a weight ratio that ranges from 0.9 to 1.1, with each other.

Without being bound by any particular theory or mechanism, a high concentration of 1,2 Hexanediol (e.g., >7%) may increase the ink penetration inside the substrate (e.g., fabric) and reduce the color density. Low concentration of 1,2 Hexanediol (e.g., <4%) may decrease the jet ability of the ink and may increase the ink deflection.

In some embodiments, the formulation further comprises one or more of the following components 1 to 6 listed below:
1. at least one binder (e.g., polymeric binder also referred to interchangeably as: "film-forming agent", or "binder");
2. a pigment;
3. a defoamer;
4. a leveling agent;
5. an antibacterial agent, and
6. a neutralizing agent.

In some embodiments, the formulation comprises water as described hereinabove.

For example, in some embodiments, the formulation comprises component 1. In some embodiments, the formulation comprises component 2. In some embodiments, the formulation comprises component 3. In some embodiments, the formulation comprises component 4. In some embodiments, the formulation comprises component 5. In some embodiments, the formulation comprises component 6. In some embodiments, the formulation comprises component 1 and 2. In some embodiments, the formulation comprises components 1, 2 and 3. In some embodiments, the formulation comprises components 1, 2, and one of components 3 to 6. In some embodiments, the formulation comprises components 1, 2, and two of components 3 to 6.

In some embodiments, one or more of components 1 to 6 mentioned above are at concentrations as follows (hereinthroughout, and unless stated otherwise, the percent refers to w/w of total formulation):
1. between about 5-20% of at least one binder;
2. between about 0.1-20% of pigment;
3. between 0.001 and 1% of at least one defoamer;

4. between 0.01 and 5% of at least one leveling agent;
5. between 0.01 and 5% of at least one antibacterial agent, and
6. between 0.01 and 5% of at least one neutralizing agent.

The Binder

The term "binder", as used herein, may refer to a bonding/binding agent which polymerizes, crosslinks to itself or crosslinks via a crosslinking agent, and affords a film or a layer upon application, optionally upon drying and curing thereof on a surface. As known in the art, binders are a group of chemicals that afford a pliable, stretchable, cohesive, and continuous or semi-continuous covering film or layer over a surface when applied thereon and allows to undergo a chemical or physical transition. The chemical or physical transition may be e.g., setting, polymerizing, drying, heating, curing, crosslinking and the like. The term "binder" may encompass coating agents, adhesives, adhesion-promoting agents, resins, polymers, co-polymers and the like, collectively.

Non-limiting families of binders include monomers, oligomers (short chains of about 10-100 monomers), polymers and copolymers of acrylates, acrylamides and other derivatives of acrylic acid, acryl/styrene, polyethylene-glycols, urethanes and polyvinylpyrrolidones, and the likes, also in the form of resin emulsions and co-emulsions. These film-forming agents can also be selected to have a relatively low glass transition temperature ($T_g$).

The way to afford a sharp image film on the substrate is to "freeze" or immobilize the droplets on contact with the substrate using the binder.

Thus, in some embodiments, the combined binding agents in the disclosed formulation are designed to afford the immobilization of the inkjet droplets on the substrate, which will eventually lead to better and sharper images.

Without being bound by any particular theory or mechanism, immobilization of the inkjet droplets on the substrate is derived from chemical and/or physical change which is affected by the disclosed inkjet formulation upon contacting thereof with the substrate.

The term "immobilization", as used in the context of embodiments of the present invention, refers to the act of restriction or substantial limitation of flowability of a liquid, namely substantial reduction of the capability of a liquid to move by flow. For example, immobilization of a liquid can be affected by congelation of the liquid or solutes therein. Immobilization of droplets of liquid ink can be achieved, for example, by elevating the viscosity of the liquid ink composition such that the droplets are restricted from flowing once in contact with the substrate.

As used herein, the term "immobilization" is not necessarily meant to include final polymerization and print fixation by crosslinking and curing reactions. Quantitatively, "immobilization" in the context of embodiment of the present invention may be defined as elevating the viscosity of the color-bearing parts of the ink composition by 10-folds, 50-folds, 100-folds, 500-folds, 1000-folds, or 2000-folds and more.

Hence, the chemical and/or physical change, according to some embodiments of the present invention, is congelation. The term "congelation", as used herein, is synonymous to the terms "coagulation", "thickening" or "gelation", and refer to the sharp decrease in fluidity of a formerly fluid liquid. Congelation can be affected also by sedimentation, precipitation, partial solidification, and/or partial polymerization of soluble constituents in the composition.

In some embodiments, the binder is selected from acrylic-based polymers and copolymers are emulsifiable self-crosslinking polymers.

Emulsifiable self-crosslinking polymers may be selected from polymers which are used in the garment industry to bestow physical and chemical resistance to the cloth, knitted, woven or non-woven, against physical wear and tear derived from frequent use and repeated washing, as well as against, organic solvents (e.g., alcohol) and water.

In some embodiments, the binding agent is a property-adjusting agent.

Property-adjusting agents include, without limitation, acids and/or bases that adjust the pH property, metal oxides, salts that adjust the ionic strength and electrical charge, oxidizing agents, reducing agents, and radical-producing agents.

Crosslinking agents may change the chemical reactivity of certain chemical groups present in one or more components of the disclosed formulation, thereby effect the solubility thereof by promoting crosslinking and/or polymerization of these components. The crosslinking agent may also promote the adhesion of the colorant to the substrate by chemically interacting with functional groups on the surface.

As used hereinabove, the phrase "crosslinking agent" refers to a substance that promotes or regulates intermolecular covalent, ionic, hydrophobic or other form of bonding between polymer chains, linking them together to create a network of chains which result in a more elastic and/or rigid structure. Crosslinking agents, according to some embodiments of the present invention, comprise at least two reactive groups that can interact with respective groups present in the polymerizable constituents of the disclosed formulation and/or the substrate.

Exemplary such reactive groups include, but are not limited to, amine groups, carboxyl groups, hydroxyl groups, double bonds, and sulfhydryl groups. Crosslinking agents may include homo-bifunctional crosslinking agents that have two identical reactive end groups, and hetero-bifunctional crosslinking agents which have two different reactive end groups. These two classes of crosslinking agents differ primarily in the chemical reaction which is used to affect the crosslinking step, wherein homo-bifunctional crosslinking agents will require a one-step reaction, and hetero-bifunctional crosslinking agents may require two steps to affect the same.

Without being bound by any particular theory or mechanism, while homo-bifunctional crosslinking agents have the tendency to result in self-conjugation, polymerization, and intracellular crosslinking, hetero-bifunctional agents allow more controlled two step reactions, which minimizes undesirable intramolecular cross reaction and polymerization. Crosslinking agents are further characterized by different spacer arm lengths. A crosslinking agent with a longer spacer arm may be used where two target groups are further apart and when more flexibility is desired.

Further, and without being bound by any particular theory or mechanism, the type of bonding between the film and the substrate depends substantially on the type of substrate, or more specifically, on the physical micro-structure of the surface, and on the availability of reactive functional groups on the surface of the substrate, namely its chemical composition. Cellulosic materials, such as many fabrics made at least a partially from natural fibers (cotton, hemp), wool, silk and even skin and leather, offer a variety of available and reactive functional groups such as hydroxyl, carboxyl, thiol and amine groups, which can be tethered to the film via the crosslinking agent. Alternatively, in cases of some substrates such as synthetic polymeric substrates, the scarcity of reactive functional groups means that the bonding of the film to the substrate is afforded by mechanical properties and micro-structure of the surface, namely affixation by polymeric adhesion and physical interweaving and entanglement.

In some embodiments, the crosslinking agent also has an effect on the elasticity of the resulting film. The resulting modification of mechanical properties of the polymeric film formed on the substrate depends on the crosslink density, i.e. low crosslink densities raise the viscosities of semi-fluid polymers, intermediate crosslink densities transform gummy polymers into materials that have elastomeric properties and potentially high strengths, and highly crosslink densities can cause materials to become rigid, glassy and even brittle.

In some embodiments, the crosslink density of the cured polymer, constituting the colorants-containing elastic film, stems primarily from the concentration of the crosslinking agent in the formulation. Hence, in some embodiments, the level of crosslink density of the cured ink composition is an intermediate level which affords a highly pliable, stretchable and elastic film.

The type of crosslinking agent may also influence the level of crosslink density, whereas the chemistry of the crosslinking reactions determines the strength and frequency (density) thereof. However, a substantial factor that affects the choice of a crosslinking agent is its chemical mechanism of action and the type of by-products which are emitted during the polymerization, crosslinking and/or curing reactions.

In some embodiments, the binders are selected from industrially used crosslinking agents in the general polymer and inkjet specific industries.

Non-limiting exemplary crosslinking agents used in the general polymer and inkjet specific industries are amino resins, or polyamines, such as melamine-formaldehyde resins. Other non-limiting exemplary families of widely used crosslinking agents include methylated melamine family, methylated imino melamine family, highly alkylated mixed ether melamine family, n-butylated melamine family, alkylated urea family, partially iso-butylated urea family, benzoguanamine family and glycoluril family.

The growing awareness among consumers, workers and manufacturers, has pushed the consumer-products market in general and the polymer industries in particular to search for compositions and processes which minimize of altogether nullify the use of harmful ingredients and the production of harmful by-products. One such by-product is formaldehyde, which is a bi-product emitted during the polymerization and curing process of polymers using crosslinking agents belonging to the aforementioned families.

Textile ink containing formaldehyde is restricted for use in certain applications, based on formaldehyde content of the garment according to Oko-Tex Standard 100 (Oeko-Tex). Although formaldehyde, which forms upon use of amino resin crosslinking agents, may evaporate from the garment at high temperatures, the levels of formaldehyde may not reach the allowed values according to the widely accepted Oko-Tex Standard 1000.

In some embodiments, the disclosed formulation is devoid of formaldehyde.

In some embodiments, the binders are characterized by a low glass transition temperature ($T_g$).

Suitable binders which may be included in the disclosed formulation are commercially available and include, without limitation, TEXICRYL™ 13-217 ($T_g$ 16° C.), TEXICRYL™ 13-218 ($T_g$ 30° C.), TEXICRYL™ 13-292 ($T_g$ 30° C.) and TEXICRYL™ 13-220 ($T_g$ 25° C.) which are commercially available from Scott Bader Ltd., and APPRETAN™ E 2100 ($T_g$ 30° C.), APPRETAN™ E 6200 ($T_g$ 200° C. and APPRETAN™ E 4250 ($T_g$ 15° C.) which are commercially available from Clariant.

Other non-limiting examples of commercially available binders, dispersants and adhesion promoters which are useful according to some embodiments of the present invention include, without limitation, commercially available and widely used families of products, known under names such as Alkydal™, Desmodur™ and Desmophen™ (from Bayer); Beckopox™, Macrynal™, Maprenal™, Viacryl™ and Vialkyd™ (from Vianova Resins); Cythane™ (from Cytec); Dynapol™ and Vestanat™ (from Hüls); Johncryl™ (from Johnson); K-Flex™ (from King Industries); Synocure™ and Synolac™ (from Cray Valley); Synthalat™ (from Synthopol); Tolonate™ (from Rhone Poulenc); Uracron™ and Uralac™ (from DSM); Worleecryl™ and Worleekyd™ (from Worlee) and the likes.

In exemplary embodiments, the binder is included in Helizarin TOW™. Helizarin TOW™ is an example of self-cross-linked acrylic binder with low glass transition temperature which provides the desired elasticity and flexibility in a print paste for conveying a soft hand to the substrate (e.g., fabric) on which a print is applied. Moreover, the low $T_g$ acrylic binder polymers cross-link with themselves to produce self-cross-linking. These polymers form a film on fibers or on the surface of the fibers of a fabric, thereby imparting thereto elasticity and flexibility that contribute to a fabric having a soft hand feel. Other polymers from the same family and exhibiting similar properties may be used.

In some embodiments, the disclosed formulation comprises a binder at a concentration of e.g., 5%, 6%, 7%, 8%, 9%, 10%, 11%, 12%, 13%, 14%, 15%, 16%, 17%, 18%, 19%, or 20%, including any value therebetween, In some embodiments, the binder is at a concentration of e.g., 5% to 10%, 10% to 15%, or 15% to 20%.

Pigment

In some embodiments, the formulation comprises a pigment.

In some embodiments, the pigment is an inorganic pigment. In some embodiments, the pigment is an organic pigment.

In some embodiments, the formulation is pigmented by the addition of at least one pigment e.g., in order to afford a cured print of a different color.

The pigment may be selected depending on the color of ink, namely, a white ink or a non-white ink.

In some embodiments, the formulation is pigmented by a white pigment. In some embodiments, the white pigment is an inorganic pigment.

Non-limiting examples of white pigment include, but are not limited to, white inorganic pigments such as titanium oxide, zinc oxide, zinc sulfide, antimony oxide, and zirconium oxide. Instead of the white inorganic pigments, white organic pigments such as white hollow resin particles and polymer particles may be used.

In exemplary embodiments, the white pigment is or comprises a titanium oxide (e.g., titanium dioxide). In some embodiments, the white pigment is in the form of a powder.

In some embodiments, the white pigment provides one or more satisfactory properties, selected from, but not limited to, color development, shielding property, dispersed particle size, and visibility (e.g., brightness).

In some embodiments, titanium dioxide is rutile-type titanium dioxide. The rutile-type titanium dioxide may be synthesized, or a commercially available product may be used. The rutile-type titanium dioxide may be synthesized by a traditional industrial method, such as a sulfuric acid method or a chlorine method.

Examples of commercially available products of rutile-type titanium dioxide include, but are not limited to, Tipaque™, CR-60-2, CR-67, R-980, R-780, R-850, R-630, R-670, and PF-736 (commercially available from Ishihara Sangyo Kaisha, LTD.).

In some embodiments, 50% of the titanium dioxide has an average particle size (referred to as "D50") in the range of 50 nm to 500 nm. In some embodiments, the titanium dioxide has a D50 in the range of 150 nm to 350 nm. In some embodiments, the titanium dioxide has a D50 within these ranges enables printed fabric (image formed thereon).

By "enables printed fabric" it is meant to refer to exhibiting satisfactory abrasion resistance and visibility of the image.

In some embodiments, the term "50% of the titanium dioxide" refers to the D50 of titanium dioxide contained in the disclosed formulation. In some embodiments, the term "50% of the titanium dioxide" refers to an equivalent spherical 50% average particle size obtained through one or more methods known in the art, e.g., dynamic light scattering (DLS).

In some embodiments, the white pigment is subjected to surface pre-treatment. For example, surface pre-treatment with alumina-silica may reduce photocatalysis.

A white pigment may afford a cured print having a color varying from white to light yellow. For example, when the pigment is a white pigment such as titanium dioxide, the color of the cured print is white-to-light yellow (e.g., white, ivory, off-white, light yellow).

In some embodiments, the disclosed formulation comprises a pigment of a non-white color, affording a cured print having a non-white color (e.g., red, magenta, green, blue, cyan, black, yellow, orange, gray, and in any shade thereof).

Examples of the non-white pigments include, but are not limited to, color pigment, black pigment, and gray pigment. Examples of the color inks include, but are not limited to, cyan ink, magenta ink, yellow ink, light cyan ink, light magenta ink, light yellow ink, red ink, green ink, and blue ink.

In some embodiments, the non-white pigment is an organic pigment.

Examples of the non-white pigment include, but are not limited to, organic compounds e.g., azo compounds, phthalocyanine, dyes, fused polycyclic compounds, nitro compounds, nitroso compounds (e.g., brilliant carmine 6B, lake red C, watching red, disazo yellow, Hansa yellow, phthalocyanine blue, phthalocyanine green, alkali blue, and aniline black).

In some embodiments, the pigments which are used are classified according to the Color Index Generic Name or Color Index Constitution Numbers. These numbers may be prefixed with C.I.

In some embodiments, the pigment is or comprises carbon black (e.g., furnace carbon black, lamp black, acetylene black, and channel black, such as C.I. Pigment Black 7).

Specific examples of the carbon black may be selected from Mitsubishi Carbon Blacks e.g., No. 2300, No. 900, MCF 88, No. 33, No. 40, No. 45, No. 52, MA 7, MA 8, MA 100, No. 2200B (commercially available from e.g., Mitsubishi Chemical Corporation); Ravens 5750, 5250, 5000, 3500, 1255, and 700 (commercially available from e.g., Columbian Chemicals Company); Regals 400R, 330R, and 660R, Mogul L, Monarchs 700, 800, 880, 900, 1000, 1100, 1300, and 1400 (commercially available from e.g., Cabot Corporation); Color Blacks FW1, FW2, FW2V, FW18, FW200, S150, S160, and S170, Printexes 35, U, V, 140U, and Special Blacks 6, 5, 4A, and 4 (manufactured by Degussa).

In some embodiments, the pigment is a yellow pigment, for example, and without limitation, C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 155, 167, 172, or 180.

In some embodiments, the pigment is a magenta pigment, for example and without limitation, C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245.

In some embodiments, the pigment is a violet pigment e.g., C.I. Pigment Violets 19, 23, 32, 33, 36, 38, 43, or 50.

In some embodiments, the pigment is a cyan pigment including, without limitation, C.I. Pigment Blues 1, 2, 3, 15, 15:1, 15:2, 15:3, 15:34, 15:4, 16, 18, 22, 25, 60, 65, and 66; or C.I. Vat Blues 4 and 60.

Examples of pigments other than the magenta, cyan, and yellow pigments include, without being limited thereto, C.I. Pigment Greens 7 and 10; C.I. Pigment Browns 3, 5, 25, and 26; and C.I. Pigment Oranges 1, 2, 5, 7, 13, 14, 15, 16, 24, 34, 36, 38, 40, 43, and 63.

Depending on the type of pigment to be used, the pigment content may be in the range of 1% to 30% (weight %), e.g., 1 to 15% relative to the total weight of the formulation.

The above-mentioned white pigments and non-white pigments may be used alone or in combination.

In some embodiments, the term "pigment" refers to a pigment dispersion. In some embodiments, the pigment dispersion comprises a dispersant.

In some embodiments, the "pigment dispersion" refers to an aqueous dispersion. In some embodiments, the "pigment dispersion" refers to a dispersion in an organic solvent.

In some embodiments, the dispersant is selected from low molecular weight dispersants and high molecular weight dispersants or a combination thereof. Without being bound by any particular theory or mechanism, the low molecular weight dispersant is capable of penetrating into agglomerates of the pigments and fillers and thus lower the attraction forces between particles and/or high molecular weight dispersants preventing re-agglomeration.

In some embodiments, the term "pigment dispersion" includes a pigment-dispersed liquid, and slurry of a pigment (e.g., aqueous dispersion having low viscosity). The pigment dispersion may have D50 ranging from 50 nm to 1 μm.

In some embodiments, at a D50 of no less than 50 nm, printed fabric exhibits satisfactory color development. In some embodiments, at D50 of no more than 1 μm, ink is sufficiently fixed.

In some embodiments, a dispersion of the white pigment has D50 that may be in the range of 100 to 600 nm, e.g., in the range of 200 to 500 nm.

In some embodiments, at D50 of not less than 100 nm, a satisfactory shielding property and color development are provided. In some embodiments, at D50 of not more than 600 nm, ink is sufficiently fixed and stably ejected.

In some embodiments, a dispersion of the non-white pigment has D50 in the range of 70 nm to 230 nm, e.g., 80 nm to 130 nm.

Examples of the pigment dispersion include, but are not limited to, self-dispersing pigments and polymer-dispersed pigments.

In some embodiments, the term "pigment" refers to a self-dispersing pigment.

In some embodiments, self-dispersing pigment may be dispersed or dissolved in an aqueous solvent without a dispersant. By "dispersed or dissolved in an aqueous solvent without a dispersant" it is meant to refer to a state in which a hydrophilic group on a surface of a pigment enables the pigment to stably exist in an aqueous solvent without the use of a dispersant which serves to disperse the pigment.

In some embodiments, the hydrophilic group is selected from —OM, —COOM, —CO—, —SO$_3$M, —SO$_2$M, —SO$_2$NH$_2$, —RSO$_2$M, —PO$_3$HM, —PO$_3$M$_2$, —SO$_2$NHCOR, —NH$_3$, and —NR$_3$. In some embodiments, M represents a hydrogen atom, an alkali metal, ammonium, a phenyl group optionally having a substituent, or organic ammonium. In some embodiments, R represents an alkyl group having 1 to 12 carbon atoms or a naphthyl group optionally having a substituent. In some embodiments, M and R are each independently selected. The self-dispersing pigment may be produced, for instance, by subjecting a pigment to physical or chemical treatment to bond the hydrophilic group onto a surface of the pigment (grafting). The physical treatment is, for example, a vacuum plasma treatment. Examples of the chemical treatment include, without limitation, a wet oxidation method in which a pigment is oxidized with an oxidant in water and a technique in which e.g., p-aminobenzoic acid is bonded onto a surface of a pigment to bond a carboxyl group through a phenyl group.

In some embodiments, the polymer-dispersed pigments may be dispersed with a polymeric dispersant.

In some embodiments, the polymeric dispersant used for dispersing a pigment has a T$_g$ of not more than 55° C., e.g., not more than 50° C.

In some embodiments, at T$_g$ of not more than 55° C., ink may be sufficiently fixed.

In some embodiments, polymeric dispersant has a weight-average molecular weight of 10,000 to 200,000 as determined by a method known in the art, e.g., through gel permeation chromatography (GPC). Such a weight-average molecular weight may further enhance the preservation stability of ink.

In some embodiments, the polymeric dispersant comprises a copolymer e.g., (meth)acrylate and (meth)acrylic acid. In some embodiments, the copolymer accounts for e.g., at least 70%, by weight of the polymer.

In some embodiments, the copolymer is produced through the polymerization with monomers selected from, but not limited to, methyl (meth)acrylate, ethyl (meth)acrylate, propyl (meth)acrylate, n-butyl (meth)acrylate, isobutyl (meth) acrylate, pentyl (meth)acrylate, hexyl (meth)acrylate, 2-ethylhexyl (meth)acrylate, octyl (meth)acrylate, nonyl (meth) acrylate, decyl (meth)acrylate, t-butylcyclohexyl (meth) acrylate, lauryl (meth)acrylate, isobornyl (meth)acrylate, cetyl (meth)acrylate, stearyl (meth)acrylate, isostearyl (meth)acrylate, tetramethylpiperidyl (meth)acrylate, dicyclopentanyl (meth)acrylate, dicyclopentenyl (meth)acrylate, dicyclopentenyloxy (meth)acrylate, and behenyl (meth) acrylate. Examples of other polymerizable monomers include hydroxy (meth)acrylate having a hydroxyl group, such as hydroxyethyl (meth)acrylate, hydroxypropyl (meth) acrylate, and diethylene glycol (meth)acrylate; urethane (meth)acrylate; and epoxy (meth)acrylate.

In some embodiments, "polymer-dispersed pigment" refers to a pigment coated with polymers. For example, microencapsulated pigments may provide a satisfactory fixing property, glossiness, and color reproducibility of formulation.

In some embodiments, a pigment coated with a polymer may be produced through phase-transfer emulsification. For example, the polymer may be dissolved in an organic solvent such as methanol, ethanol, isopropyl alcohol, n-butyl alcohol, acetone, methyl ethyl ketone, or dibutyl ether. In some embodiments, a pigment is added to the solution, and then a neutralizer and water are added to the mixture. The obtained product is then kneaded and subjected to a dispersion treatment to prepare an oil-water dispersion. In some embodiments, the organic solvent is then removed from the dispersion to yield a polymer-coated pigment as a water dispersant. In the kneading and dispersion treatment, a ball mill, a roll mill, a bead mill, a high-pressure homogenizer, or a high-speed agitating disperser may be used.

Non-limiting exemplary neutralizers are described herein and further include ethylamine, tertiary amine such as trimethylamine, lithium hydroxide, sodium hydroxide, potassium hydroxide, and ammonium.

The pigment dispersion may have pH ranging from e.g., 6 to 10.

As noted herein, in some embodiments, the average particle size of the pigment is nanosized, or microsized, e.g., 0.1 micron, 0.5 micron, 1 micron, 1.5 microns, 2 microns, 2.5 microns, or 3 microns.

In some embodiments, the pigment is provided into the formulation after a step of milling, so as to minimize discoloration of the ink formulation.

In some embodiments, the concentration of the pigment dispersion is at concentration of between about 0.1% to 10% (by weight). In some embodiments, the pigment dispersion is at concentration of between about 0.1% to 4%. In some embodiments, the concentration of the pigment dispersion is e.g., 0.1%, 0.5%, 1%, 2%, 3%, 4%, 5%, 6%, 7%, 8%, 9%, or 10%, including any value and range therebetween.

In some embodiments, the concentration of the pigment dispersion is between about 0.1-1%. In some embodiments, the concentration of the pigment dispersion is between about 1-5%. In some embodiments, the concentration of the pigment dispersion is between about 5-10%. In some embodiments, the concentration of the pigment dispersion is between about 3-6%.

Leveling Agent

In some embodiments, the formulation further comprises a flowing agent (also referred to as: "leveling agent").

In some embodiments, the term "leveling agent" means an agent that decreases the surface tension of a coating composition rendering the coating more level. In some embodiments, this term is taken to mean an additive which improves the wetting of hydrophobic surfaces, promotes flow, decreases beading, ridges, and/or aids in the prevention of coagulation of solids. The leveling agent for ink may effectively prevent deterioration in appearance of printed surfaces attributable to ruptures caused by e.g., foreign dust and at the same time impart flow-and-leveling property to the printed surfaces.

In some embodiments, the leveling agent is a water-based leveling agent. In some embodiments, the leveling agent is acrylate. In some embodiments, the leveling agent is selected from castor oil, tributyl phosphate, and soft phospholipids.

In some embodiments, the leveling agent is a reactive silicone. In some embodiments, the leveling agent is selected from, but not limited to, a polyacrylate leveling agent, a polydimethylsiloxane leveling agent, a polymethylphenylsiloxane leveling agent, and a combination thereof.

In some embodiments, the leveling agent are commercially available in or manufactured by, one or more of, without being limited thereto: Bike Gong Division e.g., Byk 381, Byk 380, Tego, e.g., Tego 270, Tego 425, Tego 450, Tego 410, PW 336, X 840, Air Product Corp., (e.g., Surfynol 102).

In some embodiments, the concentration of the leveling agent is between about 0.01% to 0.10%, by total weight. In some embodiments, the concentration of the leveling agent is e.g., 0.01%, 0.05%, 0.1%, 0.2%, 0.3%, 0.4%, 0.5%, 0.6%, 0.7%, 0.8%, 0.9%, or 1%, by total weight, including any value and range therebetween.

In some embodiments, the concentration of the leveling agent is between about 0.01-0.1%. In some embodiments, the concentration of the leveling agent is between about 0.1-0.5%. In some embodiments, the concentration of the leveling agent is between about 0.5-1%. In some embodiments, the concentration of the leveling agent is between about 0.3-0.6%.

Antibacterial Agent

In some embodiments, the formulation further comprises an antimicrobial agent, e.g., an antibacterial agent, an antifungal agent, or a biocide.

In some embodiments the antimicrobial agent is in the form of a preservative solution (e.g., Napacide).

In some embodiments, the antimicrobial agent is an organic agent (e.g., an agent selected from carbendazim derivatives or silane derivatives). In some embodiments, the antimicrobial agent is an inorganic agent (e.g., silver). In some embodiments, the antibacterial agent may react and bond with a functional group of the pigment, such as amino group, hydroxyl group, carboxyl group, phosphoric acid group or a sulfonic acid group so that the resultant molecules possess the antibacterial character.

In some embodiments, the concentration of the antimicrobial agent is between about 0.01-0.5%, by total weight. In some embodiments, the concentration of the antimicrobial agent is e.g., 0.01%, 0.05%, 0.1%, 0.2%, 0.3%, 0.4%, or 0.5%, by total weight, including any value and range therebetween.

In some embodiments, the concentration of the antimicrobial agent in the disclosed formulation is between about 0.01-0.5%. In some embodiments, the concentration of the antimicrobial agent is between about 0.01-0.1%. In some embodiments, the concentration of the antimicrobial agent is between about 0.05-0.5%.

Neutralizing Agent

In some embodiments, the formulation further comprises a neutralizing agent.

In some embodiments, the term "neutralizing agent", as used herein, refers to a basic substance which will render a water insoluble binder (which may be in the acid form) water soluble in the finally prepared aqueous printing ink. At least part of the neutralizing agent is able to leave its salt attachment to the acidic binder on heating, i.e. during the heat drying step of the printing made with the ink.

In some embodiments, the neutralizing agent is volatile and leave the printing on heat drying.

In some embodiments, the neutralizing agent is a base. In some embodiments, the base is selected from, but is not limited to, inorganic bases. The base may be organic base such as, without limitation, monoethanol amine, dimethylethanol amine, triethanol amine, diethanol amine and/or ammonia.

Exemplary neutralizing agents are amine functional bases e.g., aminomethylpropanol.

A further non-limiting examples of neutralizing agents are selected from: inorganic ammonium compounds such as ammonium carbonate, ammonium hydrogen carbonate; organic amino and amido compounds such as urea, ethanolamine, triethanolamine, diethanolamine, morpholine, creatine, hexamethylene tetramine, melamine, 1,6-diaminohexane and other organic amines.

In exemplary embodiments, the neutralizing agent is selected from diethanolamine and triethnolamine.

In some embodiments, the neutralizing agent is volatile, at least in part. In some embodiments, the efficiency of the neutralizing agent may be enhanced by the addition of a basic compound which is not sensibly volatile. Non-limiting examples for such basic compounds are basic inorganic hydroxides and salts, such as, without limitation, sodium hydroxide, sodium carbonate, sodium hydrogen carbonate, sodium oxide, the corresponding potassium and lithium compounds; oxides, carbonates and, if existing, hydrogen carbonates of calcium, magnesium, barium, strontium, zinc, further borax and other basic compounds such as sodium pyrophosphate. In some embodiments, any selected neutralizing agent should preferably be colorless and nontoxic.

In some embodiments, the concentration of the neutralizing agent in the disclosed formulation is between about 0.01-0.5%, by total weight. In some embodiments, the concentration of the neutralizing agent is e.g., 0.01%, 0.05%, 0.1%, 0.2%, 0.3%, 0.4%, or 0.5%, including any value therebetween.

In some embodiments, the concentration of the neutralizing agent is between about 0.01-0.5%, by total weight of the formulation. In some embodiments, the concentration of the antimicrobial agent is between about 0.01-0.1%. In some embodiments, the concentration of the antimicrobial agent is between about 0.05-0.5%.

Defoamer

Ink applications and processes may require foam prevention and/or foam elimination. Therefore, it may be desirable to assist foam controlling agents imparting positive ancillary surface properties, such as wetting, dispersion, emulsification, solubilization, flow and leveling, adhesion, and gloss. For example, defoamers and antifoams that act as wetting agents will greatly reduce surface defects in coatings, inks, adhesives and agricultural formulations.

In some embodiments, the disclosed formulation further comprises a defoamer, an antifoam agent, or a foam controlling agent.

In some embodiments, the terms "defoamer", "antifoam agent" and "foam controlling agent" refers to an additive that prevents, reduces or eliminates problematic foam.

Non-limiting examples of defoamers are selected from silicone based and silicone-free defoamers, alcohols, glycol ethers, mineral spirits, surfynol, acetylene diol based defoamers polysiloxane, and any combinations thereof.

Non-limiting examples of commercially-available defoamer may be selected from Tergo, e.g., Tego DF58 defoamer (Tego Chemie Service, Hopewell, Va.), BYK e.g., BYK 1719, 1730, 1740, 1790, 014, 1640, 012, 016, 037, 039 (BYK Chemie GmbH), and Surfynol 104A, 104BC, 104DPM, 104E, 104A, 104PA, 104PG50, 104S (Air Product).

In some embodiments, the concentration of the defoamer in the disclosed formulation is between about 0.005-0.5%, by total weight. In some embodiments, the concentration of the defoamer is e.g., 0.005%, 0.01%, 0.05%, 0.1%, 0.2%, 0.3%, 0.4%, or 0.5%, including any value and range therebetween.

In some embodiments, the concentration of the defoamer is between about 0.005-0.5%. In some embodiments, the concentration of the defoamer is between about 0.01-0.1%. In some embodiments, the concentration of the defoamer is between about 0.005-0.5%.

Exemplary formulations are described in the Examples section below (Tables 1-4). It is to note that the concentrations (% w/w) indicated in Tables 1-4 may vary, e.g., within the range of ±5%, independently.

The disclosed formulation optionally further comprises other ingredients according to some embodiments of the present invention, such as, for example, surfactants, wetting agents, buffering/neutralizing agents, adhesion promoters, algicides, sequestering agents, softeners, thickeners, antifoaming agents, corrosion inhibitors, light stabilizers, anticurl agents, thickeners, non-reactive agents, softeners/plasticizers, specialized dispersing agents, specialized surface active agents, irradiation sensitive agents, conductivity agents (ionizable materials) and/or other additives and adjuvants known in the relevant art.

Viscosity

According to some embodiments of the present invention, the disclosed ink formulation has one or more desired physical properties, e.g., viscosity of below 20 cPs at room temperature (about 20° C. to 30° C., e.g., 25° C.).

In some embodiments, the disclosed formulation has a viscosity below 15 cP at jetting temperature. The term "jetting temperature" refers to the temperature of the ink at the print head and is typically 20-60° C., e.g., 30-45° C.

In exemplary embodiments, the formulation has a viscosity enabling it to be printed by inkjet printing, typically a viscosity (at room temperature) of e.g., 2 cP, 3 cP, 4 cP, 5 cP, 6 cP, 7 cP, 8 cP, 9 cP, 10 cP, 11 cP, 12 cP, 13 cP, 14 cP, or 15 cP, including any value and range therebetween.

The viscosity may be measured by any method known in the art e.g., using a viscometer, with small sample adapter.

In some embodiments, the viscosity values are stable for at least 1 day, 7 days, 10 days, 20 days, 30 days, 2 months, 6 months, 1 years, or 5 years, including any value and range therebetween. By "stable" it is meant that the value is kept within a range of ±20%.

As demonstrated in the Examples section below, the viscosity may be controlled by e.g., the % of the humectant composition (typically, increasing the amount of the humectant composition results in increasing the viscosity of the disclosed formulation) and/or the by the % of the polymeric binder (typically, increasing the amount of the binder (e.g., TOW) results in increasing the viscosity of the formulation).

In some embodiments, the viscosity of the disclosed formulation is dictated by the concentration of the humectant and/or the binder. In some embodiments, increasing the concentration of the humectant and/or the binder may result in a high viscosity formulation and vice versa.

In some embodiments, the viscosity of the disclosed formulation may be adapted according to manufacturer specifications of the printing head. Thus, in some embodiments, the disclosed formulation may have low viscosity (e.g., 3 to 6 cP).

Low viscosity formulation may be utilized e.g., for Epson ink jet heads (e.g., Dx 4, 5, 6, 7, and TFP (from Epson™).

Typically, the disclosed formulation is characterized by a low viscosity when the concentration of the humectant composition is below 25%, by weight, and the concentration of the binder is below 10%, by weight (see e.g., Tables 1A-B in the Example section below).

In some embodiments, the disclosed formulation may have medium viscosity (i.e. about 6 to 9 cP) e.g., for using Ricoh inkjet heads (e.g., gen 4-5) or for using Kyocea inkjet heads.

Typically, the disclosed formulation is characterized by a medium viscosity when the concentration of the humectant composition is below 25%, by weight, and the concentration of the binder is above 5%, by weight (see e.g., Tables 2A-B in the Example section below).

In some embodiments, the disclosed formulation has high viscosity (i.e. 10 to 13 cP). High viscosity formulation may be utilized e.g., for printing heads of a manufacturer selected from, without limitation, Konica Minolta, Xaar, Polaris, Galaxy, Nova, and Toshiba.

Typically, the disclosed formulation is characterized by a high viscosity when the concentration of the humectant composition is above 25%, by weight, and the concentration of the binder is above 5%, by weight (see e.g., Tables 3A-B in the Examples section below).

In some embodiments, the formulation further comprises an additive. The additive may be identified for use for a pigment based ink-jet printing used in conjunction with a printing head. In some embodiments, the additive is selected from, without limitation, wetting agents, dispersing agents, rheology control agents, anticorrosive agents, evaporation control agents, fixation agents, and mixtures thereof.

Pretreatment Composition

A pretreatment solution e.g., for a textile to be printed, allows the printed fabric to maintain a desired color brightness and image permanence.

Application of the pretreatment to the fabric may be according to any convenient method generally known in the art. For example, in padding, the fabric is dipped or immersed in the pretreatment solution, then the saturated fabric is passed through nip rollers that squeeze out the excess solution. The amount of solution retained in the fabric can be regulated by the nip pressure applied by the rollers. Other pretreatment techniques include, but are not limited to, spray application wherein the solution is applied by spraying on the face or face and back of the fabric. Typically, but not exclusively, the pretreatment solution is used in wet pick-up technique. The solution may be of between about 20 to about 100 gram.

In some embodiments, after application of pretreatment the fabric may by dried in any convenient manner. The final percent moisture is (approximately) equal to the equilibrium moisture of the pretreated fabric at ambient temperature, and can vary somewhat depending on the relative humidity of the surrounding air. The resin (binder) remaining in the fabric after drying provides the absorbent layer for the inkjet inks during printing.

In some embodiments, there is provided a composition (referred to as "pretreatment composition") comprising two components: (i) one or more organic acids and (ii) one or more acrylic polymers.

In some embodiments, the pretreatment composition is water-based formulation.

In some embodiments, the pretreatment composition is an aqueous solution.

In some embodiments, the organic acids are selected from, without being limited thereto, citric acid, lactic acid, formic acid, glycolic acid, succinic acid, tartaric acid, fumaric acid, and malic acid, or mixtures thereof, or polymers thereof (e.g., polylactic acid).

In some embodiments, the organic acids are at a total concentration (w/w) of 0.5% to 10%.

For example, in some embodiments, the organic acids are at a total concentration of 0.5%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%, by weight, including any value and range therebetween.

In some embodiments, the organic acids are at a concentration (w/w) of 0.5% to 1%. In some embodiments, the organic acids are at a concentration of 0.2% to 0.8%, 0.3% to 0.7%, or 0.5% to 2%. In some embodiments, the organic acids are at a concentration of 2% to 4%. In some embodiments, the organic acids are at a concentration of 4% to 6%. In some embodiments, the organic acids are at a concentration of 6% to 8%. In some embodiments, the organic acids are at a concentration of 8% to 10%.

In some embodiments, the pretreatment solution further comprises a self-crosslinking component (e.g., polymer).

As used herein and in the art, "self-crosslinking polymers" contain a functionality which is self-reactive and consequently do not require the use of a co-reactant species per se.

In some embodiments, the crosslinking component comprises polycarboxylic acid and a polyhydric alcohol.

In some embodiments, the self-crosslinking polymer is selected from, but is not limited to, Acrodur 3515, Acrodur 950, Acrodur 3530 (from BASF) which is an aqueous solution of a modified polycarboxylic acid and a polyhydric alcohol.

In some embodiments, the self-crosslinking polymer is at a concentration (w/w) of 0.5% to 10%.

For example, in some embodiments, the self-crosslinking polymer is at a concentration of 0.5%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%, including any value and range therebetween.

In some embodiments, the self-crosslinking polymer is at a concentration (w/w) of 0.5% to 1%. In some embodiments, the organic acids are at concentration of 0.5% to 2%. In some embodiments, the self-crosslinking polymer is at a concentration of 2% to 4%. In some embodiments, the self-crosslinking polymer is at a concentration of 4% to 6%. In some embodiments, the self-crosslinking polymer is at a concentration of 6% to 8%. In some embodiments, the self-crosslinking polymer is at a concentration of 8% to 10%.

In some embodiments, the organic acid(s) and the self-crosslinking polymer(s) are in a weight ratio that ranges from 10:1 to 1:10.

In some embodiments, the organic acid(s) and the self-crosslinking polymer(s) are in a weight ratio of e.g., 8:1, 7:1, 6:1, 5:1, 4:1, 3:1, 2:1, 1:1, 1:2, 1:3, 1:4, 1:5, 1:6, 1:7, or 1:8, including any ratio therebetween.

In exemplary embodiments, the organic acid(s) and the self-crosslinking polymer(s) are in a weight ratio of 1:4, respectively.

In exemplary embodiments, the formulation comprises 0.5% citric acid and 2% ACRODUR 3530, ACRODUR 3515 or ACRODUR 950.

In some embodiments, additional agents and reagents, e.g., an adhesion promoter, may further be added to the pretreatment formulation so as to add specific desired properties e.g., guar. For example, organic silanes may be added for improving smoothness.

In some embodiments, as exemplified in the Examples section below, there is synergism between the two above-mentioned components (i) and (ii), and the printing qualities for one or more parameters are enhanced with respect to the individual components alone.

The term "synergism" has been defined in the art as a state of action of two materials in which the effect of the combination is greater than the arithmetic sum of the effects.

In some embodiments, the synergism is observed with respect to one or more properties selected from, but not limited to, rub (or abrasion) resistance of the printed material (e.g., colorfastness to crocking), enhancement of the color brightness, and bleeding elimination at printing. The above-mentioned properties may be determined by a method or a standard known in the art.

It is noted that any exemplary ingredient disclosed herein is given for exemplifying purposes only, and should not be regarded as limiting to that particular ingredient or commercially available product, but rather regarded as a representative member of a wider group of alternatives, all of which are meant to be encompassed in the context of other embodiments of the present invention.

The Printing Method

In some embodiments, there is provided a method for printing on a flexible substrate, the method comprising:

immersing the flexible absorptive substrate in the pretreatment composition;

drying (or curing) the flexible substrate; and printing the formulation onto the substrate.

In some embodiments, the method is devoid of a sublimation step.

In some embodiments, the method further comprises a step of incorporating the disclosed formulation into a printing head.

In some embodiments, the printing is performed using a printing head, e.g., drops of the disclosed formulation are jetted therefrom onto a flexible substrate.

In some embodiments, the drying step is performed for at least 1 min at a temperature of at least 50° C.

In some embodiments, the drying step is performed for at least 1 hour at a temperature of less than 50° C.

As described hereinabove, in some embodiments, the flexible substrate is an absorptive substrate.

In some embodiments, the flexible substrate is selected from, in a non-limiting manner, woven and non-woven fabrics, cotton, polyester, natural and synthetic leather.

General

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Formulation for Low Viscosity (4-6 cP)

Exemplary low viscosity (4-6 cP) inkjet formulations are shown in Tables 1A, and 1B below. The low viscosity formulations were tested for use for the following printing heads: Epson heads, Dx 4,5,6,7 and TFP.

TABLE 1A

| | | % |
|---|---|---|
| water | Balance | Up to 100 |
| Defoamer | Byk, tego, air- product: Df58, D104, Byk 1719 | 0.01 |
| Humectant | 1,2 Hexanediol | 5 |
| | PG | 6 |
| | Glycerin | 6 |
| | PEG 400 | 6 |
| polymer | Helizarin TOW* | 5 |
| pigment dispersion | Cyan/Magenta/Black/Yellow/Orange/Green/Red/Gray/Blue | 4 |
| leveling agent | Byk, tego, air-product: 465,348,347 | 0.5 |
| anti-bacterial | Napacide, optional | 0.1 |
| neutralizing agent | Triethanolamine/Diethanolamine | 0.1 |
| | Total | 100 |

TABLE 1B

| | | % |
|---|---|---|
| water | Balance | 67.29 |
| Defamer | Byk, tego, air- product: Df58, D104, Byk 1719 | 0.01 |
| Humectant | 1,2 Hexanediol | 5 |
| | PG | 6 |
| | Glycerin | 6 |
| | PEG 400 | 6 |
| polymer | Helizarin TOW* | 5 |
| pigment dispersion | Cyan/Magenta/Black/Yellow/Orange/Green/Red/Gray/Blue | 4 |
| anti-bacterial | Napacide, optional | 0.1 |
| neutralizing agent | Triethanolamine/Diethanolamine | 0.1 |
| | Total | 100 |

Formulation for Mid Viscosity

Exemplary mid viscosity (6-9 cP) inkjet formulations are shown in Tables 2A-B below. The mid viscosity formulation was tested for use for the following printing heads: Ricoh Gen 4-5, and Kyocera.

TABLE 2A

| | | % |
|---|---|---|
| water | Balance | Up to 100 |
| Defoamer | Byk, tego, air- product: Df58, D104, Byk 1719 | 0.01 |
| Humectant | 1,2 Hexanediol | 5 |
| | PG | 6 |
| | Glycerin | 6 |
| | PEG 400 | 6 |
| polymer | Helizarin TOW | 10 |
| pigment dispersion | Cyan/magenta/black/yellow/orange/green/red/gray/blue | 4 |
| leveling agent | Byk, tego, air-product: 465,348,347 | 0.5 |
| anti-bacterial | Napacide, optional | 0.1 |
| neutralizing agent | Triethanolamine/Diethanolamine | 0.1 |
| | Total | 100 |

TABLE 2B

| | | % |
|---|---|---|
| water | Balance | |
| Defoamer | Byk, tego, air- product: Df58, D104, Byk 1719 | 0.01 |

TABLE 2B-continued

| | | % |
|---|---|---|
| Humectant | 1,2 Hexanediol | 2-3 |
| | PG | 6-12 |
| | Glycerin | 22-26 |
| | PEG 400 | 5-7 |
| polymer | Helizarin TOW | 6-8 |
| pigment dispersion | Cyan/magenta/black/yellow/orange/green/ red/gray/blue | 4 |
| anti-bacterial | Napacide, optional | 0.1 |
| neutralizing agent | Triethanolamine/Diethanolamine | 0.1 |
| | Total | 100 |

Formulation for High Viscosity

Exemplary high viscosity (10-13 Cp in 30° C.) inkjet formulations are shown in Tables 3A-B below. The mid viscosity formulation were tested for use for the following printing heads: Konica Minolta, Xaar, Polaris, Galaxy, Nova, and Toshiba.

TABLE 3A

| | | % |
|---|---|---|
| Water | Balance | Up to 100 |
| Defoamer | Byk, tego, air- product: Df58, D104, Byk 1719 | 0.01 |
| Humectant | 1,2 Hexanediol | 6-7 |
| | PG | 7-8 |
| | Glycerin | 7-8 |
| | PEG 400 | 7-8 |
| Polymer | Helizarin TOW | 10-13 |
| Pigment Dispersion | Cyan/magenta/black/yellow/orange/green/ red/gray/blue | 4 |
| Leveling Agent | Byk, tego, air-product: 465,348,347. | 0.5 |
| Anti-Bacterial | Napacide, optional | 0.1 |
| Neutralizing agent | Triethanolamine/Diethanolamine | 0.1 |
| | Total | 100 |

TABLE 3B

| | | % |
|---|---|---|
| Water | Balance | — |
| Defoamer | Byk, tego, air- product: Df58, D104, Byk 1719 | 0.01 |
| Humectant | 1,2 Hexanediol | 3-2 |
| | PG | 3-2 |
| | Glycerin | 22-26 |
| | PEG 400 | 8-12 |
| Polymer | Helizarin TOW | 10-13 |
| Pigment Dispersion | Cyan/magenta/black/yellow/orange/green/ red/gray/blue | 4 |
| Leveling Agent | Byk, tego, air-product: 465,348,347,349 | 0.5 |
| Anti-Bacterial | Napacide, optional | 0.1 |
| Neutralizing agent | Triethanolamine/Diethanolamine | 0.1 |
| | Total | 100 |

The viscosity of the above-mentioned (i.e. Tables 1-3) formulations was stable after incubation for 30 days in 60° C. These formulations were tested in Ricoh Gen 5 head printer and stabile jetting were performed.

Example 2

Pretreatment Compositions

Formulation

The compositions comprise component (i) and (ii):

(i) 0.5% (0.5%-10%) citric acid or similar organic acid class like lactic acid, formic acid, glycolic acid;

(ii) 2% (0.5-10% depend on type of substrate) self-crosslinked polymer ACRODUR 3530 or ACRODUR 3515 or ACRODUR 950 L or similar self-thermal cross linker.

Method

In exemplary procedures, padding was performed using a pedder equipment.

Padding Method for Applying Pretreatment: in exemplary procedures, the fabric pretreatment was applied to various textile substrates by padding, in which the fabric was dipped in the pretreatment solution against a trough holding unit containing the pretreatment solution, whereby the saturated fabric was then passed through nip rollers that squeeze out the excess coating or pretreatment solution. The amount of solution retained in the fabric was regulated by the nip pressure applied by the rollers.

The wet pick-up of the pretreatment solution is dependent on the particular substrate (e.g., fabric) and is between 40-80% pick up, with 70%-75% wet pick-up being typical, while the dry pick-up is ~10%.

The fabric was thereafter oven dried at 150° C. for 3 min, or at 160° C. for 2 min, or at 170° C. for 1 min. It is to note that the fabric may be not completely dried when time is too short.

In exemplary procedures, an adhesion promoter was used, selected from Byk 4509, Byk C8000, Byk 4500, and Byk 4513.

The pretreatment solution add-on was calculated by weighing the fabric immediately before and after the pre-treatment application and the results are expressed by wet g/m$^2$ of fabric, or by conditioning the fabric in a constant temperature/constant humidity room (21° C. (70° F.)/50% RH) overnight to get dried g/m$^2$. The add-on percentage (usually in dry g) can then be calculated. In general, the pretreatment add-on was 30-35% on cotton 15-20% on a polyester/cotton blend and 10-20% on polyester.

Results

The results are summarized in Table 4 below.

The numbers relating to "washing fastness" and "color-fastness to crocking" represent the results of the corresponding property as visualized and estimated in the scale of 0 to 5.

It is to note that high-scaled properties (4 or 5) were not observed following using a formulation having only one component ((i) or (ii)).

TABLE 4

| Substrate | | Untreated 100% COTTON | Treated Fabric 100% COTTON | Untreated PES/COTTON 50/50 | treated fabric PES/COTTON 50/50 | Untreated POLYESTER 100% | treated fabric POLYESTER 100% | Untreated 100% VISCOSE | treated fabric 100% VISCOSE | Untreated COTTON/ ELASTAN 95/5 | treated fabric COTTON/ ELASTAN 95/5 |
|---|---|---|---|---|---|---|---|---|---|---|---|
| Test Method | Washing fastness AATCC test Method 61-49c/ ISO 105C10 | 5 | 5 | 5 | 5 | 5 | 5 | 5 | 5 | 5 | 5 |
| | Colorfastness Wet to Crocking ISO 105 | 3 | 4, 5 | 2, 3 | 4 | 2 | 3, 4 | 3 | 4, 5 | 3 | 4, 5 |
| | Dry | 3, 4 | 4, 5 | 2, 3 | 4 | 2 | 3, 4 | 3 | 4, 5 | 3 | 4, 5 |
| | Density | 0.8 | 1.1 | — | 1.2 | — | 1.4 | — | — | — | — |
| | Printing Results | Bleeding | Sharp line | Bleeding | Sharp line | Bleeding | Sharp line | Bleeding | Sharp line | Bleeding | Sharp line |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A formulation comprising a humectant composition, at least one pigment, and at least one compound selected from:
   (a) a binder;
   (b) a defoamer;
   (c) a leveling agent;
   (d) an antibacterial agent;
   (e) a neutralizing agent; and
   (f) water
   wherein:
   said humectant composition is at a concentration that ranges from 10% to 40%, by weight, and
   said humectant composition comprises at least two different organic compounds each comprising one or more hydroxyl groups, wherein said at least two organic compounds are in a weight ratio that rages from about 0.5 to 1.5 with each other, wherein said formulation comprises between about 15% to about 30%, by weight, of said humectant composition and:
   a) between about 3-20%, by weight, of said binder;
   b) between about 1-20%, by weight of said pigment
   c) between about 0-2% of said leveling agent
   d) between about 0-1% of said neutralizing agent, and
   e) between 50-70% of water, and wherein said formulation is an ink formulation formulated for priting on a flexible textile substrate.

2. The formulation of claim 1, wherein said at least one pigment is a microsized or nanosized particle.

3. The formulation of claim 1, wherein one of said at least two organic compounds is glycerol one of said at least two organic compounds is glycol.

4. The formulation of claim 3, wherein said glycol is selected from the group consisting of: propylene glycol, polyethylene glycol (PEG), and mono-, di- and tri-propylene glycol.

5. The formulation of claim 3, wherein said glycol is PEG, wherein said PEG has a molecular weight that ranges from 200 Dalton to 600 Dalton.

6. The formulation of claim 1, wherein said binder comprises an acrylic polymer having a glass transition temperature (Tg) below 50° C.

7. The formulation of claim 1, wherein said humectant composition is at a concentration of below 25%, by weight.

8. The formulation of claim 1, wherein said humectant composition is at a concentration of above 25%, by weight.

9. The formulation of claim 1, wherein said binder is at a concentration that ranges from 3% to 15%, by weight.

10. The formulation of claim 1, having a viscosity of 4 cP to 6 cP at 25° C.

11. The formulation of claim 1, having a viscosity of 6 cP to 8 cP at 25° C.

12. The formulation of claim 1, having a viscosity of 8 cP to 15 cP at 25° C.

* * * * *